United States Patent
Tanaka

(10) Patent No.: US 6,554,286 B1
(45) Date of Patent: Apr. 29, 2003

(54) METAL GASKET ASSEMBLY FOR CYLINDER HEAD

(75) Inventor: Akira Tanaka, Saitama Pref. (JP)

(73) Assignee: Nippon Leakless Industry Co., Ltd., Tokyo (JP)

( * ) Notice: Subject to any disclaimer, the term of this patent is extended or adjusted under 35 U.S.C. 154(b) by 0 days.

(21) Appl. No.: 09/706,808

(22) Filed: Nov. 7, 2000

(30) Foreign Application Priority Data

Nov. 8, 1999 (JP) .......................................... 11-317066

(51) Int. Cl.$^7$ .............................. F02F 11/00; F16J 15/08
(52) U.S. Cl. ...................... 277/591; 277/594; 277/595
(58) Field of Search ............................... 277/591, 594, 277/595

(56) References Cited

U.S. PATENT DOCUMENTS

| | | | | |
|---|---|---|---|---|
| 5,427,388 A | * | 6/1995 | Ueta | 277/595 |
| 5,560,623 A | * | 10/1996 | Yoshino | 277/595 |
| 5,690,342 A | * | 11/1997 | Tanaka et al. | 277/594 |
| 5,879,011 A | * | 3/1999 | Takata et al. | 277/593 |

FOREIGN PATENT DOCUMENTS

| | | |
|---|---|---|
| JP | 7-239034 | 9/1995 |
| JP | 10-281289 | 10/1998 |
| JP | 11-6564 | 1/1999 |

* cited by examiner

Primary Examiner—Anthony Knight
Assistant Examiner—Christopher Boswell
(74) Attorney, Agent, or Firm—Young & Thompson

(57) ABSTRACT

A metal gasket assembly which can enhance the sealing function for combustion pressure in a cylinder bore and maintain the sealing function for a long time, comprises a metal base plate, and a metal reinforcement plate having a thickness smaller than that of the base plate and lapped with the base plate, the base plate having cylinder openings formed at positions corresponding to cylinder bores in a cylinder block of an internal combustion engine, annular beads formed respectively around the cylinder openings and having a V-shaped cross section, a plurality of coolant holes formed in the peripheral parts of the annular beads, and an outer peripheral bead entirely surrounding the annular beads and the plurality of coolant holes and having a cross-sectional shape of slope, and the reinforcement plate having fold-over parts which are folded onto the projection side of the annular bead at the peripheral edge parts of the cylinder openings in the base plate, and extend into the inside of the annular beads so as to form grommets embracing the peripheral edge parts, lapped parts which extend from the peripheral edge parts of the cylinder openings to positions in the vicinity of and outside of the annular beads, on the depression side of the annular beads, and reinforcement beads formed in the lapped parts and projected in the same direction as the direction of the projection of the annular beads so as to be made into close contact with the annular beads.

8 Claims, 3 Drawing Sheets

METAL GASKET ASSEMBLY FOR CYLINDER HEAD

BACKGROUND OF THE INVENTION

1. Field of the Invention

The present invention relates to a metal gasket assembly for a cylinder head, which is interposed between a cylinder block and a cylinder head of an internal combustion engine.

2. Related Art

For example, Japanese Patent Laid-Open No. H11-6564 discloses a metal gasket assembly for a cylinder head, this conventional metal gasket assembly comprises a metal base plate and a metal reinforcement plate having a thickness smaller than that of the base plate and lapped with the latter.

Further, in this conventional metal gasket assembly, the base plate is formed therein with cylinder openings formed in positions corresponding to cylinder bores of a cylinder block of an internal combustion engine, annular beads formed around the cylinder openings and having cross-sectional shape of 'V', a plurality of coolant holes formed around the annular beads and an outer peripheral bead formed so as to entirely surround the annular beads and the plurality of coolant holes and having a cross-sectional shape of slope. The reinforcement plate comprises fold-over parts which are folded around the peripheral edge parts of the cylinder openings in the base plate toward the projection side of the annular beads and extend up to the inside of the annular beads so as to form grommets embracing the peripheral edge parts, lapped parts extending from the peripheral edge parts of the cylinder openings in the base plate to the outer edge part of the base plate on the depression side of the annular bead, and reinforcement beads formed on the lapped parts and projected in the same direction as the direction of the projection of the annular beads so as to be made into close contact with the annular beads, stress relieving parts formed also on the lapped parts and adapted to expand and contract at the positions of coolant holes in the base plate.

However, in this conventional metal gasket, since the reinforcement plate extends up to the outer edge part of the base plate, beyond the coolant holes in the base plate, the reinforcement plate is lapped with the outer peripheral bead of the base plate so as to bear a fastening force of fastening bolts for a cylinder head, and accordingly, the surface pressure of the annular beads is lowered. Thus, there has been raised such a problem that the sealing function of the annular beads on the base plate cannot be enhanced further.

Further, Japanese Patent Laid-Open No. H11-2325 discloses a metal gasket assembly for a cylinder head, and this conventional metal gasket assembly comprises a metal base plate, and a reinforcement plate having a thickness smaller than that of the base plate, and lapped with the base plate.

Further, in this metal gasket assembly, the base plate has cylinder openings formed at positions corresponding to cylinder bores in a cylinder block of an internal combustion engine, annular beads formed around the cylinder openings and having a cross-sectional shape of 'V', a plurality of coolant holes formed around the annular beads, and an outer peripheral bead formed so as to entirely surround the annular beads and the coolant holes and having a cross-sectional shape of slope. The reinforcement plate comprises fold-over parts which are folded onto the projection side of the annular bead around the peripheral edge parts of the cylinder openings in the base plate, and extend into the inside of the annular bead so as to form grommets embracing the peripheral edge parts, and lapped parts which extend from the peripheral edge parts of the cylinder openings to positions outside of and vicinity of the annular beads, on the depression side of the annular beads.

However, since the above-mentioned conventional metal gasket assembly has the flat reinforcement plate, a combustion pressure in the cylinder bores of the cylinder block should be sealed by the resilient force of only the annular beads on the base plate, and accordingly, there has been raised such a problem that the sealing function cannot be enhanced sufficiently for the combustion pressure.

SUMMARY OF THE INVENTION

An object of the present invention is to provide a cylinder head metal gasket assembly which can advantageously solve the above-mentioned problems, and accordingly, the metal gasket according to the present invention comprises a metal base plate, and a metal reinforcement plate having a thickness smaller than that of the base plate and lapped with the base plate, the base plate having cylinder openings formed at positions corresponding to cylinder bores in a cylinder block of an internal combustion engine, annular beads formed respectively around the cylinder openings and having a V-shaped cross section, a plurality of coolant holes formed in the peripheral parts of the annular beads, and an outer peripheral bead entirely surrounding the annular beads and the plurality of coolant holes and having a cross-sectional shape of slope, and the reinforcement plate having fold-over parts which are folded onto the projection side of the annular beads around the peripheral edge parts of the cylinder openings in the base plate, and extend into the inside of the annular beads so as to form grommets embracing the peripheral edge parts, lapped parts which extend from the peripheral edge parts of the cylinder openings to positions in the vicinity of the annular beads and outside of the annular beads, on the depression side of the annular beads, and reinforcement beads formed in the lapped parts and projected in the same direction as the direction of the projection of the annular beads so as to be made into close contact with the annular beads.

This cylinder head metal gasket assembly is interposed between a cylinder block and a cylinder head of an internal combustion engine, and is then fastened so that the annular beads formed around the cylinder bores corresponding respectively to cylinder bores in the cylinder block, and having a cross-sectional shape of 'V', and the reinforcement beads which are projected in the same direction as the projecting direction of the annular beads so as to be made into close contact with the annular beads, can prevent combustion gas from blowing to the outside from the cylinder bores of the cylinder block, through a high resilient force in cooperation of the annular beads and the reinforcement beads, and the outer peripheral bead which entirely surrounds the plurality of coolant holes corresponding to coolant passages formed respectively in the cylinder head and the cylinder block and communicated with one another, can prevent coolant from leaking from the coolant passages.

Further, with this cylinder head metal gasket assembly, the lapped parts of the reinforcement plate extend only to positions outside of the annular beads and around the annular beads in the base plate, but do not extend to the outer edge part of the base plate, beyond the coolant holes in the base plate, and accordingly, the reinforcement plate is prevented from being lapped with the outer peripheral bead of the base plate in order to prevent a fastening force of a cylinder head fastening bolt from being born. Therefore, the surface pressure of the annular beads becomes higher enough, and further, the annular beads of the base plate and the reinforcement beads of the reinforcing plate are lapped with one another so as to seal the outer peripheral edges of the cylinder bores with a high resilient force in cooperation between the annular beads and the reinforcement beads. The grommets formed by the reinforcement plate restrain the degrees of depression of the annular beads and reinforcement beads, and accordingly, the resilient forces of the beads can be prevented from lowering.

Accordingly, with the cylinder head metal gasket assembly according to the present invention, the sealing function against the combustion pressure in the cylinder bores can be sufficiently enhanced, and the high degree of the sealing function can be maintained for a long time.

In a preferred embodiment of the present invention, a second base plate having the same planar shape and thickness as those of the base plate but having annular beads and an outer peripheral bead which are projected in a direction different from the direction of the projection of the annular beads and the outer peripheral bead of the base plate, is lapped with the base plate on the projection side of the annular beads thereof. With this arrangement, the sealing function can be further enhanced by these beads on both base plates.

Further, in a preferred embodiment of the present invention, the reinforcement plate is made of a material having a degree of elongation which is greater than that of the base plate. With this arrangement, when the reinforcement plate is folded so as to form grommets, the fold-over parts can be easily formed with no defect.

Further, in a preferred embodiment of the present invention, the difference in thickness between the base plate and the reinforcement plate is set to be equal to or greater than 50 $\mu$m but equal to or smaller than 150 $\mu$m. With a difference in thickness smaller than 50 $\mu$m, the surface pressure of the annular beads is not sufficiently high, but with a difference in thickness higher than 150 $\mu$m, the sealing function of the outer peripheral bead is lowered.

DESCRIPTION OF PREFERRED EMBODIMENTS OF THE INVENTION

Preferred embodiments of the present invention will be described below with reference to the accompanying drawings.

Figure 1:
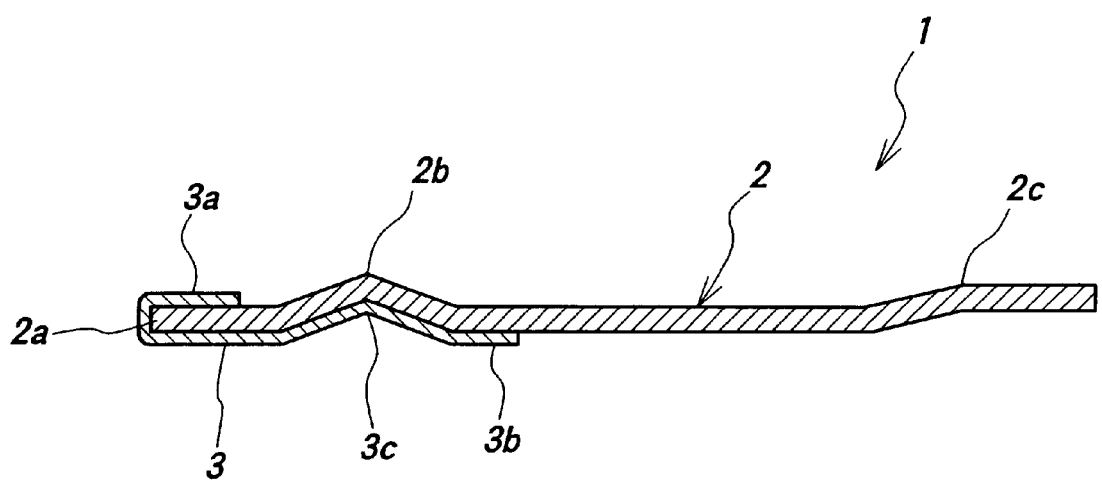
FIG. 1 is a sectional view along line A—A in FIG. 2, illustrating an embodiment of a cylinder head metal gasket assembly according to the present invention.

At first, a cylinder head gasket in a first embodiment of the present invention will be explained with reference to FIGS. 1 and 2.

The cylinder head metal gasket assembly 1 comprises a metal base plate 2, a metal reinforcement plate 3 having a thickness smaller than that of the metal base plate 2 and lapped with the base plate 2. Specifically, the base plate 2 is made of a SUS-301 stainless steel material having a thickness of 0.2 mm which is used for a base plate of usual metal gasket, and the reinforcement plate 3 is made of a SUS-304 stainless steel material having a thickness of 0.1 mm which is used for a reinforcement plate forming grommets for a usual metal gasket, with a degree of elongation greater than that of the base plate so that a fold-over part can be easily formed.

The base plate 2 in the metal gasket assembly 1 in this embodiment has cylinder openings 2a formed at positions corresponding to three bores in the cylinder block of a gasoline engine as an internal combustion engine, annular beads 2b formed around the cylinder openings 2a, being upward projected in this embodiment, and having a V-shaped cross section (the so-called full bead shape), a plurality of coolant holes 2d formed in the peripheral parts of the annular beads 2b, and an outer peripheral bead 2c formed so as to entirely surrounding three annular beads 2b and the plurality of coolant holes 2d in the peripheral parts thereof and having a cross-sectional shape of slope (the so-called half bead shape), which is raised outward (rightward in FIG. 1) of the gasket assembly in this embodiment, and further has bolt holes 2e, for cylinder head mounting bolts, lubrication oil holes 2f for circulating engine lubrication oil, lubrication hole beads 2g surrounding the lubrication oil holes 2f and having a cross-sectional shape of slope and the like. It is noted the front end parts (upper end parts) of the annular beads 2b, and the outer end part (upper end part) of the outer peripheral bead 2c are indicated by one-dot-chain lines in FIG. 2.

Further, the reinforcement plate 3 in the metal gasket assembly 1 in this embodiment, has fold-over parts 3a folded at the edge parts of the cylinder openings 2a in the base plate 2 toward the projection side of the annular beads 2b so as to extend inward of the annular beads 2b in order to form grommets embracing the above-mentioned edge parts, lapped parts 3b extending from the edge parts of the cylinder openings 2a in the base plate 2 to positions outside of the annular beads 2b and vicinity of the annular beads 2b on the depression side of the annular beads 2b, and reinforcement beads 3c formed on the lapped parts 3b and projected in the same direction as the direction of the projection of the annular beads 2b so as to be made into close contact with the annular beads 2b, and is formed in an annular shape.

The metal gasket assembly 1 in this embodiment is interposed between the cylinder block and the cylinder head of the gasoline engine, and is fastened by the cylinder head mounting bolts, and accordingly, the annular beads 2b having a V-shaped cross section, around the cylinder openings 2a corresponding to the cylinder bores in the cylinder block, and the reinforcement beads 3c projected in the same direction as the direction of the projection of the annular beads 2b so as to be made into contact with the annular beads 2b prevent, by their high resilient force in cooperation, combustion gas in the cylinder bores of the cylinder block from blowing to the outside, and the outer peripheral bead 2c surrounding the plurality of coolant holes corresponding to coolant passages which are formed in the cylinder block and the cylinder head so as to be communicated with one another, prevents coolant from leaking from the coolant passages.

Further, in this metal gasket assembly 1 in this embodiment, since the lapped parts 3b of the reinforcement plate 3 extend only to positions outside of and vicinity of the annular beads 2b on the base plate 2, but do not extend up to the outer edge part of the base plate 2 beyond the coolant holes 2d in the base plate 2, the reinforcement plate 3 is not lapped with the outer peripheral bead 2c so as to prevent the fastening force of the cylinder head fastening bolts from being born. Thus, the surface pressure of the annular beads 2b becomes sufficiently high, while the annular beads 2b of the base plate 2 are lapped with the reinforcement beads 3c of the reinforcement plate 3 so as to seal the outer peripheries of the cylinder bores with a high resilient force in cooperation. Further, the grommets formed by the reinforcement plate 3 restrain the degrees of depression of the annular beads 2b and reinforcement beads 3c in order to prevent the resilient forces of these beads from lowering.

Accordingly, in the metal gasket assembly 1 in this embodiment, the sealing function against the combustion pressure in the cylinder bores can be sufficiently enhanced, and the high degree of the sealing function can be maintained for a long time.

Further, in the metal gasket assembly 1 in this embodiment, since the reinforcement plate 3 is made of a material with a degree of elongation which is greater than that of the base plate 2, the grommets can be easily formed with no defect by folding back the reinforcement plate 3.

Further, in the metal gasket assembly 1 in this embodiment, the difference in thickness between the base plate 2 and the reinforcement plate 3 is set to be 0.1 mm, that is, 100 µm, and accordingly, not only the surface pressures of the annular beads can be sufficiently be increased but also the sealing function of the outer peripheral bead can be sufficiently ensured.

Figure 2:
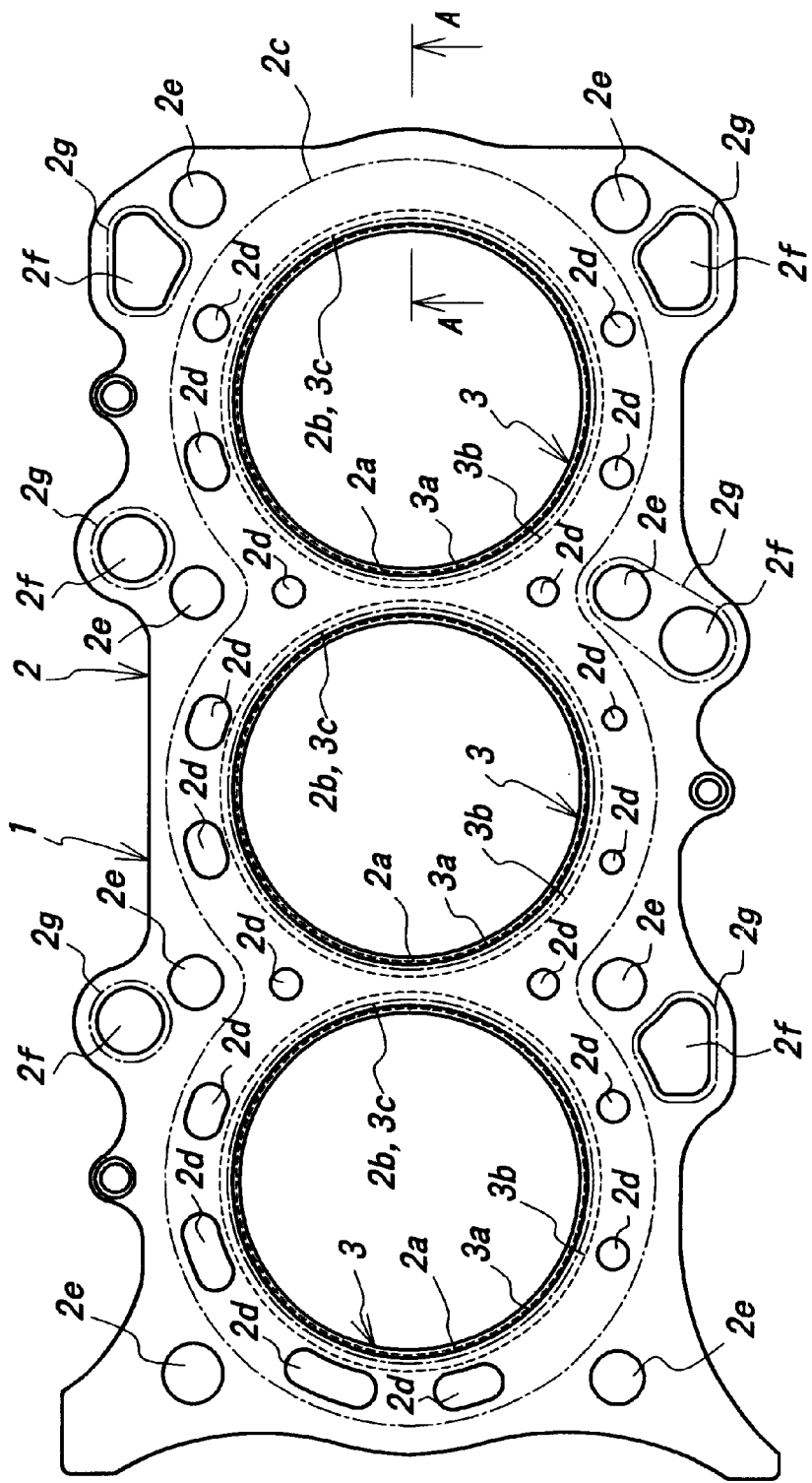
FIG. 2 is a plan view illustrating the metal gasket assembly according to the present invention.
Figure 3:
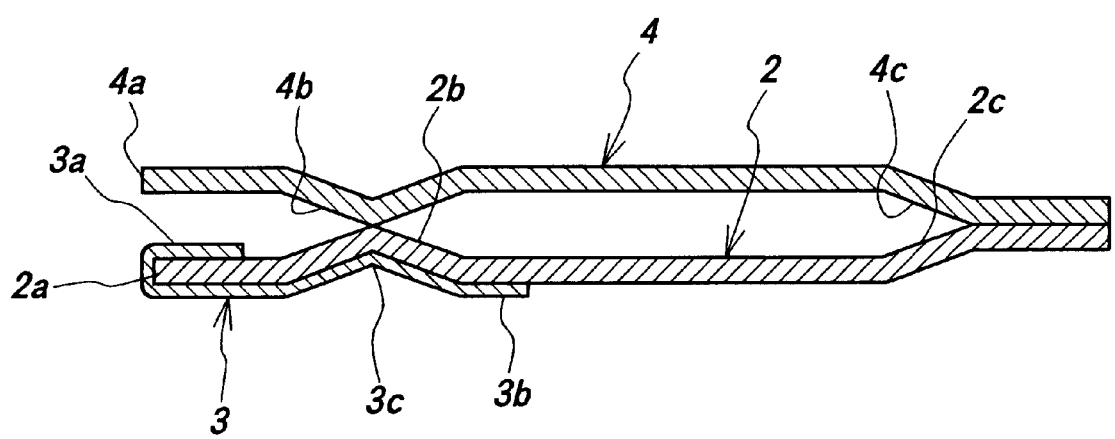
FIG. 3 is a sectional view along line A—A in FIG. 2, illustrating another embodiment of a cylinder head gasket assembly according to the present invention.

Referring to FIG. 3 which shows another embodiment of the present invention, and which is a sectional view along line A—A in FIG. 2. In FIG. 3, like reference numerals denotes like parts to those shown in FIGS. 1 and 2.

In this metal gasket assembly 1 in this embodiment, the base plate 2 in the first embodiment is lapped with a second base plate 4 having a planar shape, a material and a thickness which are the same as those of the base plate 2, and similarly having cylinder bores 4a, annular beads 4b and an outer peripheral bead 4c which are projected in a direction different from the direction of the projection of the annular beads 2b and the outer peripheral bead 2c. With this embodiment, the beads 2b, 2c and 4b, 4c of both base plates 2, 4 can further enhance the sealing function.

Although the present invention has been exemplified with reference to the drawings, the present invention should not be limited to the above-mentioned embodiments. For example, although it has been explained that the metal gasket assembly comprises the reinforce plate and the one or two base plates in the above-mentioned embodiments, it is possible to add an auxiliary plate so as to adjust the overall thickness of the metal gasket assembly.

What is claimed is:

1. A metal gasket assembly comprising a metal base plate, and a metal reinforcement plate having a thickness smaller than that of the base plate and lapped with the base plate, said base plate having a cylinder opening formed at a position corresponding to a cylinder bore in a cylinder block of an internal combustion engine, an annular bead formed around said cylinder opening and having a V-shaped cross section projecting from a projection side of said base plate, a plurality of coolant holes formed outside said annular bead, and an outer peripheral bead entirely surrounding said annular bead and said plurality of coolant holes, and having a cross-sectional shape of slope, and said reinforcement plate comprising fold-over parts folded around the edge parts of said cylinder opening in said base plate, toward said projection side, and extending inward of the annular bead so as to form grommets embracing the edge parts of said cylinder opening, said fold-over parts including parts extending from the edge parts of the cylinder opening to positions outside of said annular bead but inside of said coolant holes and entirely inside of said slope, on the side of the depression of the annular bead, and having a reinforcement bead projected in a direction the same as that of the direction of the projection of the annular bead and in close contact with the annular bead.

2. A metal gasket assembly as set forth in claim 1, wherein said base late is lapped on the projection side of the annular bead with a second base plate having a planar shape and a thickness which are the same as those of said base plate, and having an annular bead and an outer peripheral bead which are projected in a direction different from the direction of the projection of the annular bead and the outer peripheral bead of said base plate.

3. A metal gasket assembly as set forth in claim 1, characterized in that said reinforcement plate is made of a material having a degree of elongation which is greater than that of said base plate.

4. A metal gasket assembly as set forth in claim 1, wherein a difference in thickness between said base plate and said reinforcement plate is set to be equal to or greater than 50 µm but equal to or smaller than 150 µm.

5. A metal gasket assembly as set forth in claim 2, characterized in that said reinforcement plate is made of a material having a degree of elongation which is greater than that of said base plate.

6. A metal gasket assembly as set forth in claim 2, wherein a difference in thickness between said base plate and said reinforcement plate is set to be equal to or greater than 50 µm but equal to or smaller than 150 µm.

7. A metal gasket assembly as set forth in claim 3, wherein a difference in thickness between said base plate and said reinforcement plate is set to be equal to or greater than 50 µm but equal to or smaller than 150 µm.

8. A metal gasket assembly as set forth in claim 5, wherein a difference in thickness between said base plate and said reinforcement plate is set to be equal to or greater than 50 µm but equal to or smaller than 150 µm.

* * * * *